United States Patent
Singh et al.

(10) Patent No.: US 11,321,000 B2
(45) Date of Patent: May 3, 2022

(54) SYSTEM AND METHOD FOR VARIABLE SPARING IN RAID GROUPS BASED ON DRIVE FAILURE PROBABILITY

(71) Applicant: EMC IP HOLDING COMPANY LLC, Hopkinton, MA (US)

(72) Inventors: Gopal Singh, Lucknow (IN); Rahul Vishwakarma, Bangalore (IN); Parmeshwr Prasad, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 23 days.

(21) Appl. No.: 16/847,096

(22) Filed: Apr. 13, 2020

(65) Prior Publication Data
US 2021/0326052 A1    Oct. 21, 2021

(51) Int. Cl.
| | | |
|---|---|---|
| *G06F 3/06* | (2006.01) | |
| *G06F 12/00* | (2006.01) | |
| *G06F 13/00* | (2006.01) | |
| *G06N 20/10* | (2019.01) | |

(52) U.S. Cl.
CPC .......... *G06F 3/0632* (2013.01); *G06F 3/0619* (2013.01); *G06F 3/0635* (2013.01); *G06F 3/0689* (2013.01); *G06N 20/10* (2019.01)

(58) Field of Classification Search
CPC ..... G06F 3/0632; G06F 3/0619; G06F 3/0635
USPC ....................................................... 711/114
See application file for complete search history.

(56) References Cited

U.S. PATENT DOCUMENTS

| | | | | |
|---|---|---|---|---|
| 5,742,792 A | * | 4/1998 | Yanai | G06F 3/0619 714/763 |
| 6,237,063 B1 | * | 5/2001 | Bachmat | G06F 3/061 714/6.32 |
| 8,230,193 B2 | * | 7/2012 | Klemm | G06F 3/0607 711/114 |
| 9,921,912 B1 | * | 3/2018 | Vankamamidi | G06F 11/1092 |
| 9,946,471 B1 | | 4/2018 | More et al. | |
| 10,082,965 B1 | | 9/2018 | Tamilarasan et al. | |
| 10,268,521 B2 | * | 4/2019 | Choi | G06F 9/5061 |

(Continued)

OTHER PUBLICATIONS

Inductive Venn-Abers predictive distribution, Ilia Nouretdinov, Denis Volkhonskiy, Pitt Lim, Paolo Toccaceli, Alexander Gammerman; Proceedings of the Seventh Workshop on Conformal and Probabilistic Prediction and Applications, PMLR 91:15-36, 2018 (Year: 2018).*

*Primary Examiner* — Mohamed M Gebril
(74) *Attorney, Agent, or Firm* — Anderson Gorecki LLP

(57) ABSTRACT

Drives of a RAID group are classified as either healthy or failing using a trained learning process. The failure probability is then determined for each failing drive using a Venn-ABERS framework which provides a boundary range on the failure prediction probability. A variable sparing mechanism is used to enable one or more drives of the RAID group to be used as dual-purpose drives. In a first state, the dual-purpose drives are user-addressable drives and are available to be used to process IO workload on the RAID group. Spreading the IO workload on the RAID group across a larger number of drives results in increased performance in the form of reduced latency. In a second state, the dual-purpose drives are not user-addressable and are spare drives in the RAID group, which improves the level of protection provided to data stored in the RAID group.

18 Claims, 10 Drawing Sheets

(56) References Cited

U.S. PATENT DOCUMENTS

| | | | | |
|---|---|---|---|---|
| 10,409,648 B1* | 9/2019 | Bhatia | G06F 9/5083 |
| 10,592,111 B1* | 3/2020 | Wang | G06F 3/0619 |
| 2008/0259710 A1* | 10/2008 | Wenzel | G06F 1/3221 |
| | | | 711/114 |
| 2010/0106919 A1* | 4/2010 | Manning | G06F 3/0659 |
| | | | 711/E12.002 |
| 2010/0145647 A1* | 6/2010 | Bouchard | G06F 11/0751 |
| | | | 702/85 |
| 2011/0145197 A1* | 6/2011 | Kamohara | G06F 16/20 |
| | | | 707/E17.007 |
| 2011/0197024 A1* | 8/2011 | Thomas | G06F 3/0689 |
| | | | 711/E12.001 |
| 2015/0378858 A1* | 12/2015 | Ishizaka | G06F 11/2094 |
| | | | 714/6.22 |
| 2017/0200582 A1* | 7/2017 | Yashima | H01J 37/3026 |
| 2017/0315745 A1* | 11/2017 | Agombar | G06F 3/0631 |
| 2017/0344431 A1* | 11/2017 | Coatney | G06F 11/004 |
| 2019/0087290 A1* | 3/2019 | Rutman | H04L 67/1095 |
| 2019/0163379 A1* | 5/2019 | Bottan | G06F 3/065 |
| 2020/0104200 A1* | 4/2020 | Kocberber | G06K 9/6256 |
| 2020/0174900 A1* | 6/2020 | Cagno | G06F 3/0619 |
| 2021/0149777 A1* | 5/2021 | Gao | G06F 11/079 |

* cited by examiner

SYSTEM AND METHOD FOR VARIABLE SPARING IN RAID GROUPS BASED ON DRIVE FAILURE PROBABILITY

FIELD

This disclosure relates to computing systems and related devices and methods, and, more particularly, to a system and method for variable sparing in RAID groups based on drive failure probability.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, drives of a RAID group are classified as either healthy or failing using a trained learning process. The failure probability is then determined for each failing drive using a Venn-ABERS framework. The use of the Venn-ABERS framework along with a classification algorithm not only makes a prediction as to which capacity drives 215 are likely to fail, but also provides a boundary range on the failure prediction probability, which is more reliable than classical binary output of classification algorithms. A variable sparing mechanism is used to enable one or more drives of the RAID group to be used as dual-purpose drives, which in a first state are user-addressable drives and in a second state are dedicated spare drives that are not user-addressable. By using a variable sparing mechanism, when the capacity drives of a RAID group are healthy, the number of spare drives associated with the RAID group can be reduced, and the extra user-addressable drives can then be used as additional capacity drives to share the IO workload on the RAID group. The ability to use one or more additional drives enables the IO workload on the RAID group to be spread across a larger number of drives, thus resulting in increased performance in the form of reduced latency. By contrast, when it is determined that the RAID group has a higher probability of having one or more capacity drives fail, the number of spare drives associated with the RAID group is able to be increased, which improves data availability.

DETAILED DESCRIPTION

Figure 2:
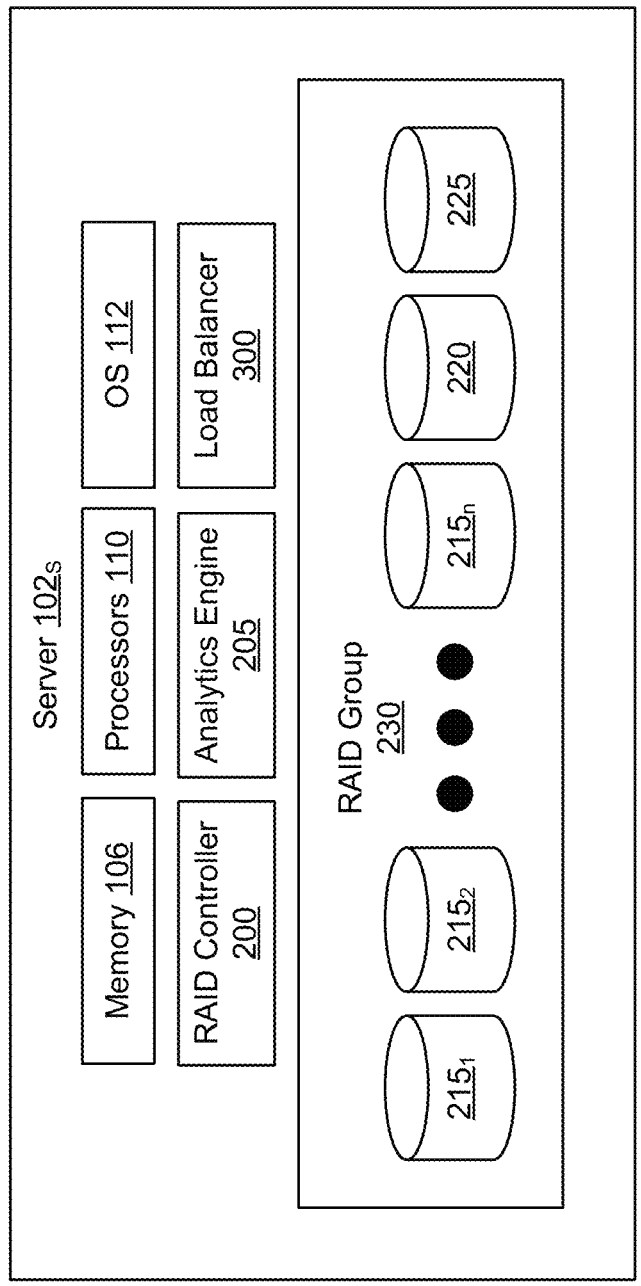
FIG. 2 is a functional block diagram of a server, according to some embodiments.

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure. Specifically, those of ordinary skill in the art will recognize that the inventive concepts may be used by any system or server that utilizes a RAID group to organize storage resources. An example server of this nature is shown in FIG. 2. Accordingly, the invention is not limited to an implementation in a storage system 100 but may also be implemented in other systems such as the server shown in FIG. 2.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and/or computer instructions that are stored on a non-transitory tangible computer-readable medium and implemented by multi-purpose tangible processors, and any combinations thereof.

Figure 1:
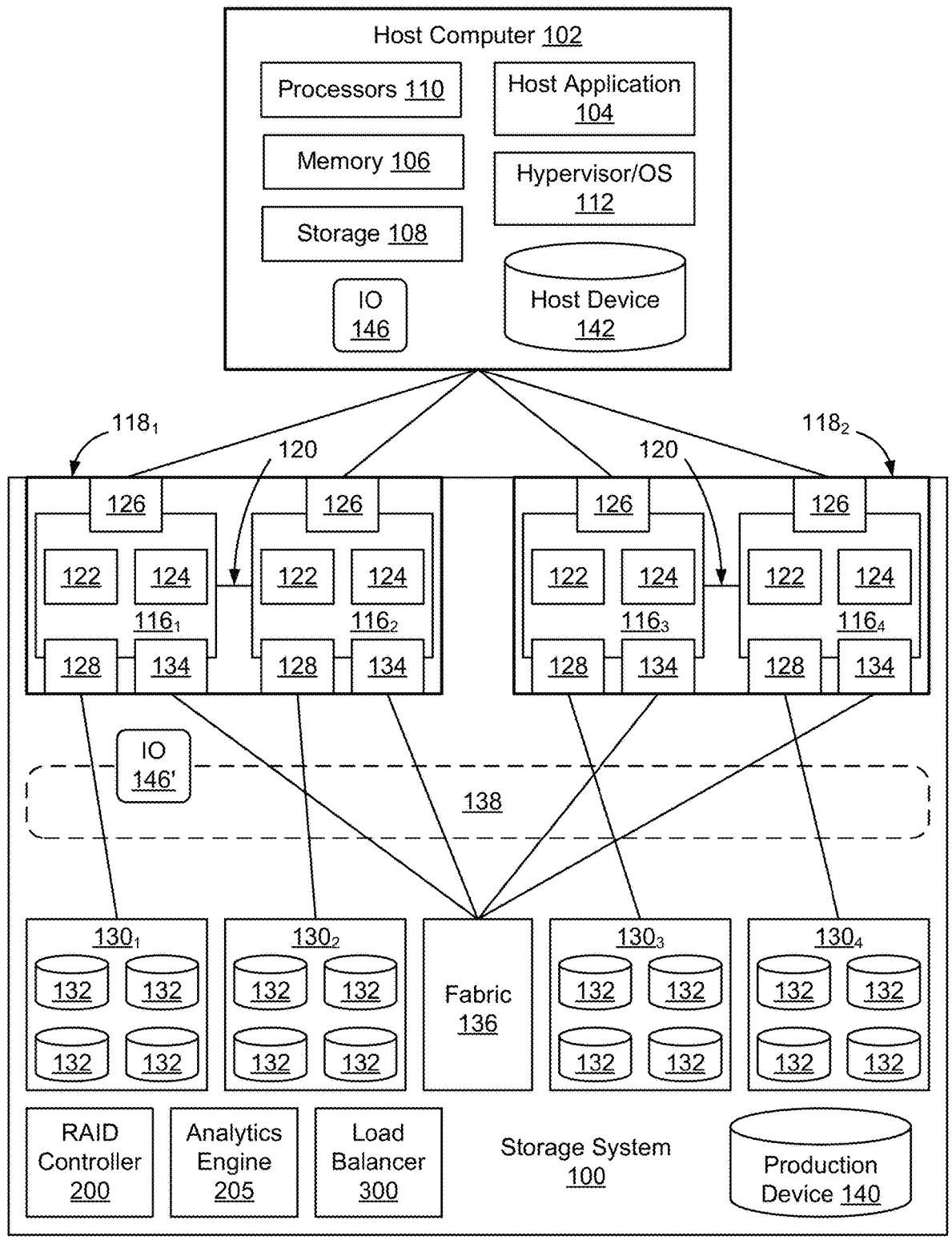
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (operating system) 112. The processors 110 may include one or more multi-core processors that include multiple CPUs, GPUs, and combinations thereof. The volatile memory 106 may include RAM (Random Access Memory) of any type. The persistent storage 108 may include tangible persistent storage components of one or more technology types, for example and without limitation Solid State Drives (SSDs) and Hard Drive Drives (HDDs) of any type, including but not limited to SCM (Storage Class Memory), EFDs (enterprise flash drives), SATA (Serial Advanced Technology Attachment) drives, and FC (Fibre Channel) drives. Optionally, sets of drives of persistent storage 108 may be organized into RAID groups, as discussed in greater detail herein. The host computer 102 might support multiple virtual hosts running on virtual machines or containers, and although an external host computer 102 is illustrated, in some embodiments host computer 102 may be implemented as a virtual machine within storage system 100.

FIG. 2 shows an implementation of a stand-alone host computer 102 implemented as a server $102_S$. The components of server $102_S$, in some embodiments, are the same as those described in connection with host 102 of FIG. 1.

In some embodiments, the storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, one or more types of RAM, and in some embodiments is used to implement a cache for processors 122. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using Non-Volatile Memory (NVM) media technologies, such as NAND-based flash, or higher-performing Storage Class Memory (SCM) media technologies such as 3D XPoint and Resistive RAM (ReRAM). Managed drives 132 may be directly connected to the compute nodes $116_1$-$116_4$ using a PCIe bus, or may be connected to the compute nodes $116_1$-$116_4$, for example, by an InfiniBand (IB) bus or IB fabric switch 136. Optionally, sets of drives of persistent storage 108 may be organized into RAID groups, as discussed in greater detail herein.

In some embodiments, each compute node 116 also includes one or more CAs (channel adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via Direct Memory Access (DMA) or Remote Direct Memory Access (RDMA) such that each compute node 116 may implement atomic operations on the local volatile memory 124 of itself and on the local volatile memory of each other compute node 116 in the storage system 100.

The storage system 100 maintains data for the host applications 104 running on the host computer 102. For example, host application 104 may write host application data to the storage system 100 and read host application data from the storage system 100 in order to perform various functions. Examples of host applications 104 may include, but are not limited to, file servers, email servers, block servers, and databases.

Logical storage devices are created and presented to the host application 104 for storage of the host application data. For example, a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (logical block addresses) on which data used by the host application 104 resides and can be stored. However, the data used by the host application 104 and the storage resources available for use by the host application 104 may actually be maintained by one or more of the compute nodes $116_1$-$116_4$ at non-contiguous addresses in shared global memory 138 and on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an input/output command (IO) 146 from the host application 104 to the host device 142, the hypervisor/OS 112 determines whether the IO 146 can be serviced by accessing the host computer memory 106 or storage 108. If that is not possible then the IO 146 is sent to one of the compute nodes $116_1$-$116_4$ to be serviced by the storage system 100.

In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory 138 from the managed drives 132 and sent to the host application 104 via one of the compute nodes 116$_1$-116$_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes 116$_1$-116$_4$ and paths, although the storage system 100 can be configured to limit use of certain paths to certain production devices 140.

Managed drives 132 can be organized in many ways. One common way to organize sets of drives is to create RAID (Redundant Array of Independent Drives) groups. Example RAID groups 230 are shown in FIGS. 2 and 7-10 and are discussed in greater detail below. To make a RAID group 230 more resilient against drive failure, it is possible to add a spare drives to the RAID group 230 (dedicated sparing) or to a set of RAID groups (distributed sparing). Including a spare drive in a RAID group enables the data of a failed drive to be immediately restored onto the spare drive, which allows the RAID group to continue to operate until the failed drive is able to be replaced. While this results in redundancy of storage, and drive sparing can significantly improve data availability and protection, since the spare drives are not user-addressable, the drive space of the spare drive is wasted until a failure occurs.

In some embodiments, a method is provided in which, within a given RAID group, the critical drives that may fail are identified. In some embodiments, the probability of a drive failing is determined using a Venn-ABERS framework over a classification algorithm. A variable sparing mechanism is then provided in which some drives act as dual-purpose drives 220, which in a first state are user-addressable drives and in a second state are dedicated spare drives that are not user-addressable. FIGS. 7-10 show an example RAID group of this nature, as discussed in greater detail below.

This approach has several advantages. First, the use of the Venn-ABERS framework along with a classification algorithm not only makes a prediction as to which capacity drives 215 are likely to fail, but also provides a boundary range on the failure prediction probability, which is more reliable than classical binary output of classification algorithms. Second, by using a variable sparing mechanism, when the capacity drives of a RAID group are healthy, the number of spare drives associated with the RAID group can be reduced, and the extra user-addressable drives can then be used as additional capacity drives to share the IO workload on the RAID group 230. The ability to use one or more additional drives enables the IO workload on the RAID group 230 to be spread across a larger number of drives, thus resulting in increased performance in the form of reduced latency. By contrast, when it is determined that the RAID group has a higher probability of having one or more capacity drives fail, the number of spare drives associated with the RAID group is able to be increased, which improves data availability. In some embodiments, this approach enables more optimum utilization of drives and avoids over or under sparing in a RAID group.

Classification algorithms can be used to predict the future state of a drive 132, to predict whether the drive will keep running or whether it will fail. In some classification processes, Self-Monitoring, Analysis, and Reporting Technology (S.M.A.R.T.) parameters are collected and used by the classification process to give a binary output, namely (1) status of drive is NORMAL, or (2) status of drive is FAILED (n-days ahead). From a management perspective, it is difficult to make decisions solely on this output, because the classification algorithm does not provide information about the confidence of the decision. Since these metrics are not available, management may be forced to remove the drives that are classified as failing or allocate more spare drives to the RAID group which has failing drives, which increases the amount of storage required to implement a given RAID group or set of RAID groups.

Additionally, current systems often implement RAID groups along with spare drives for better read/write performance and fault tolerance. The roles of drives are strictly defined. Capacity drives hold the user data and spare drives hold nothing. A spare drive's only purpose is to be ready to replace a capacity drive in the event of its failure. Thus, in a conventional RAID group, the spare drives are not user addressable, meaning a user can't use this storage to write data. Although a spare drive becomes critical in the event of a capacity drive failure, at other times the spare drives are not used.

According to some embodiments, a Venn-ABERS framework is used in connection with a classification algorithm to provide both a drive failure prediction and a boundary value of the probability of the failure prediction. This enhanced failure classification is used in connection with a variable sparing mechanism to enable spare drives to be used as capacity drives when the probability of failure of the other capacity drives of a RAID group is sufficiently low, to thereby distribute IO workload across a larger set of drives when the capacity drives of the RAID group are healthy, while enabling the dual purpose drive to be converted to an augmented spare drive when one or more of the capacity drives of the RAID group are sufficiently likely to fail.

In some embodiments, the demarcation between a spare drive and a capacity drive is removed, based on the likelihood of one of the capacity drives of a RAID group failing. Where most of the classification algorithms predict which drives would fail in coming n-days, in some embodiments a robust mathematical framework based on algorithmic randomness on top of an underlying classification algorithm is used to also obtain the probability boundaries of the drive failure prediction. This helps in obtaining the quality of prediction and furthers decision-making.

Figure 3:
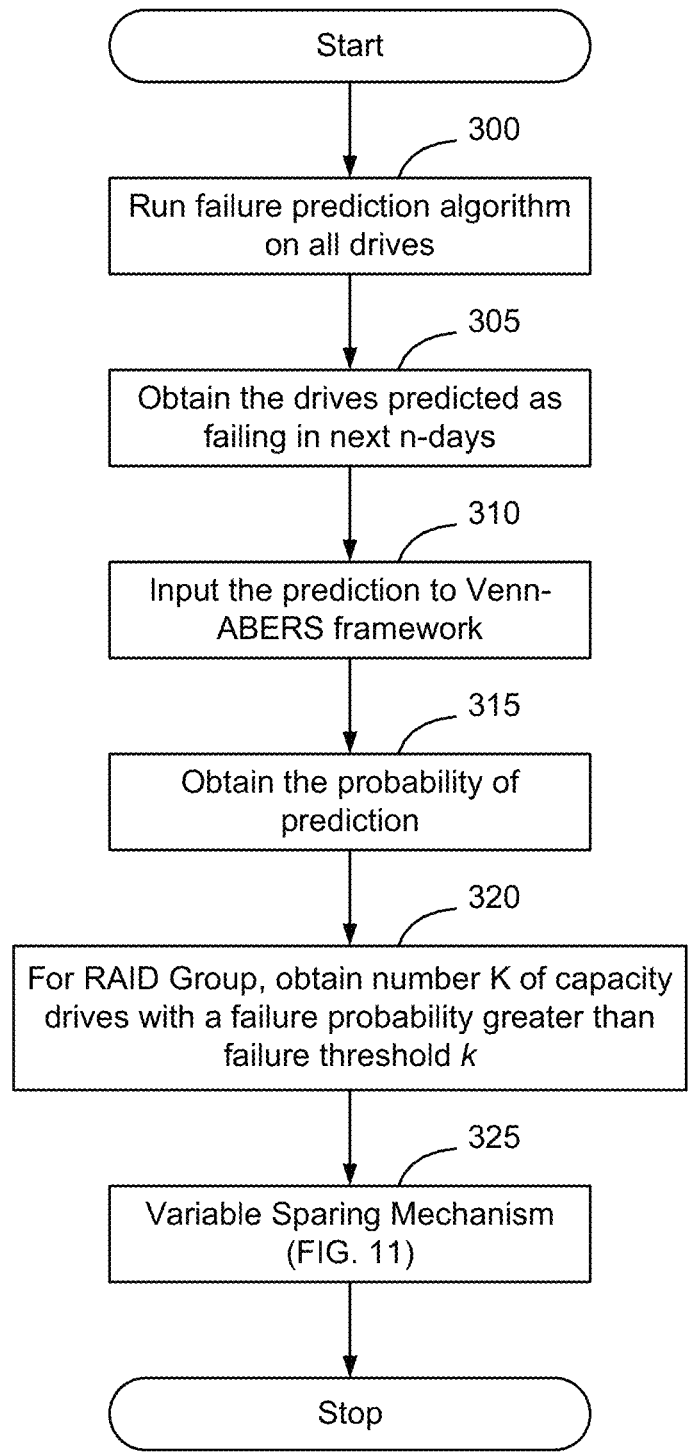
FIG. 3 is a flow chart of an example method of determining drive failure probability of drives in RAID groups, according to some embodiments.

FIG. 3 is a flow chart of an example method of determining drive failure probability of drives in a RAID group, according to some embodiments. As shown in FIG. 3, the method includes running a failure prediction algorithm on all drives (block 300). In some embodiments, the failure prediction algorithm is implemented by a supervised learning process 500 (see FIG. 5) that has been trained to make a drive classification based on drive operational (S.M.A.R.T.) parameters. In some embodiments, the learning process 500 is a Support Vector Machine (SVM) classifier, although other classification processes may be used as well. The drives that are predicted to fail in the next n days are thus identified (block 305), and are input to the Venn-ABERS framework (block 310). An example Venn-ABERS framework 505 is discussed in greater detail in connection with FIG. 5. The Venn-ABERS framework is used to obtain the probability of the prediction (block 315).

For each RAID group, the process then obtains the number of drives K with a failure probability greater than a failure threshold k (block 320). The result of this step is then used to implement the variable sparing mechanism (block 325) which is described in greater detail herein in connection with FIGS. 7-11. The process described in connection with FIG. 3 may be implemented periodically, for example each hour, daily, weekly, on demand, or on some other schedule depending on the implementation.

In some embodiments, the use of a Venn-ABERS framework over an underlying classification algorithm enables the method to obtain the criticality of a failing drive by providing boundary values of the failure prediction. A wider boundary value is indicative of a less reliable prediction, while a narrower boundary value indicates a more reliable prediction. By determining the boundary width of the failure prediction, the process is able to know with greater certainty the likelihood of a capacity drive failure. Having additional certainty in the failure prediction and the probability associated with the correctness of the prediction, enables drives to be implemented as dual purpose drives rather than solely as spare drives, to thereby avoid over-allocating spare capacity to a given RAID group.

The method offers a principled way of assigning a probability to predictions and the end goal is to predict the probability distribution of the label, given the training set and the test object.

Figure 4:
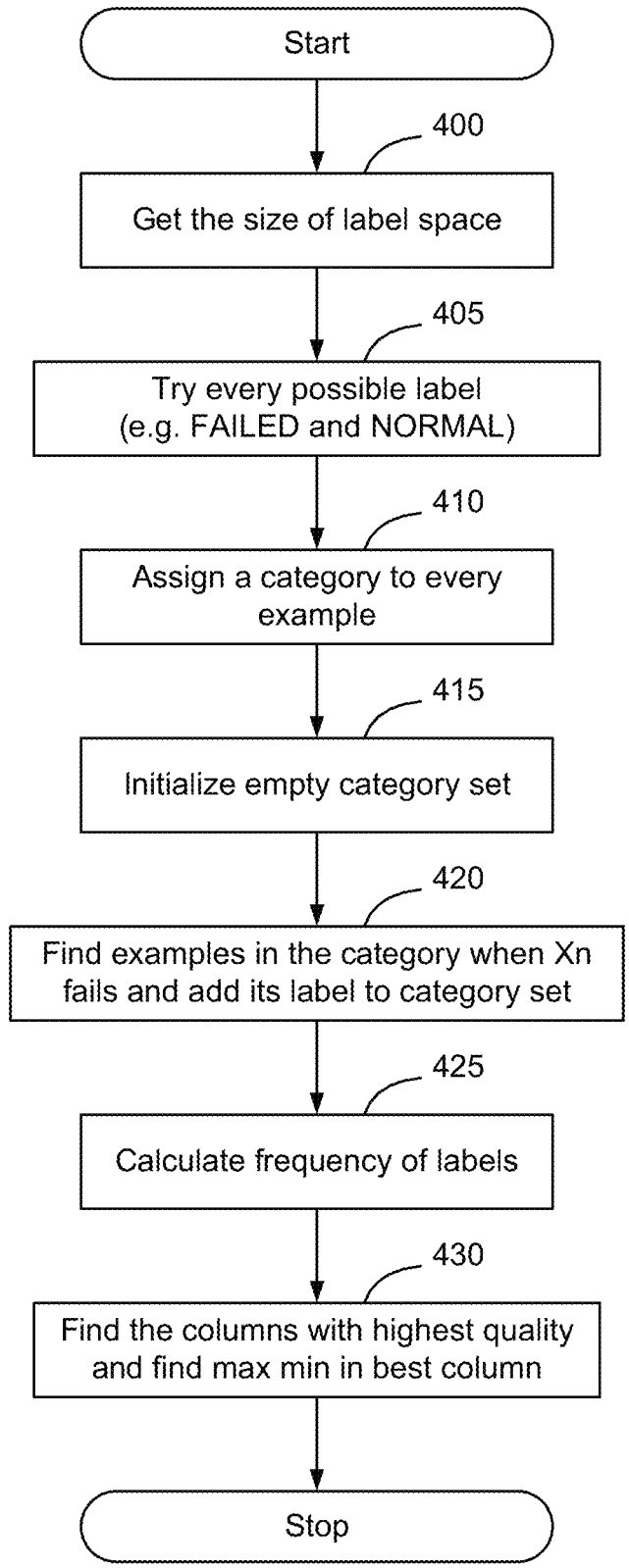
FIG. 4 is a flow chart of a process of implementing a Venn-ABERS framework, according to some embodiments.

There are several techniques available to solve binary classification problems that can be used for capacity drive failure prediction. Ordinary classification minimizes the loss function by predicting correct labels. Venn-ABERS classification creates a probability distribution over the set of classes along with a probability boundary measure. FIG. 4 is a flow chart of a process of implemented by a Venn-ABERS framework, according to some embodiments.

As shown in FIG. 4, in some embodiments the Venn-ABERS framework 505 starts by getting the size of the label space (block 400). The Venn-ABERS framework 505 then tries every possible label which, in some embodiments, includes the labels FAILED and NORMAL (block 405). The Venn-ABERS framework 505 then assigns a category to every example (block 410) and initializes an empty category set (block 415). The Venn-ABERS framework 505 then finds examples in the category when drive Xn fails, and adds its label to the category set (block 420). The Venn-ABERS framework 505 then calculates the frequency of labels (block 425) and finds the columns with the highest quality and max/min in the best column (block 430). The output of the Venn-ABERS framework 505 is a probability boundary that a particular classification on a particular capacity drive is correct. Table I shows example pseudocode for Venn-ABERS framework 505, according to some embodiments.

TABLE I

Algorithm: Multi-Probabilistic Classification Prediction
Data: training set Z(n−1), testing example xn
Result: predicted label ŷn, probability interval [ln, un]
   K ← |Y|;
   for y = 0 to K − I do
     for i =1 to n do
       Ti ← Taxonomy ((x1, y1), . . . (xi−1, yi−1), (xi+1, yi+1), (xn, y), (xi, yi));
     end
     C ← φ
     for i=1 to n do
       if Ti = Tn then
         C ← AddToSet(C, yi);
       end TABLE I-continued end
     Py ← CalcFrequency(C);
   end
   Jbest ← FindBestColumn(P);
   [ln, un] ← FindInterval(Jbest, P);
   Ŷn ← Jbest;
   return ŷn, [ln, un]

Figure 5:
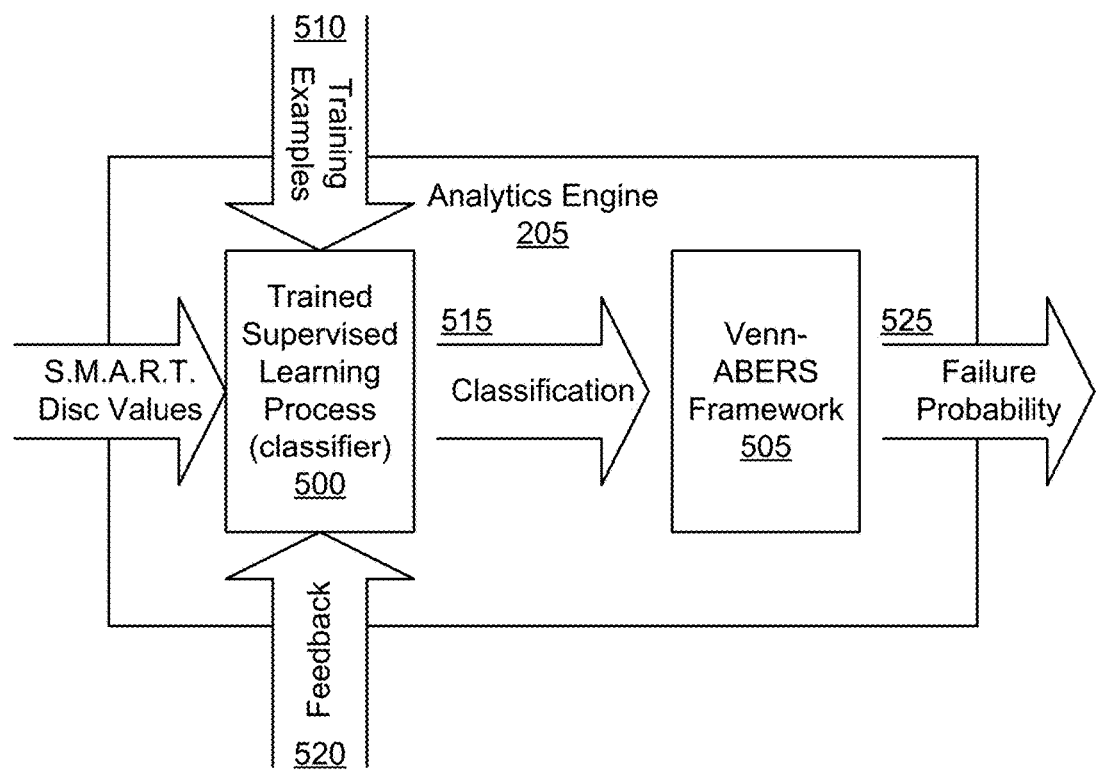
FIG. 5 is a functional block diagram of an analytics engine, according to some embodiments.

FIG. 5 is a functional block diagram of an analytics engine 205, according to some embodiments. In some embodiments, the analytics engine 205 is implemented as a process executing in the storage system 100, as shown in FIG. 1. The analytics engine 205 is not required to be implemented in the storage system 100, however, and is not required to execute on the same computer/emulation as the RAID controller 200. As shown in FIG. 5, in some embodiments a supervised machine learning process 500, such as a Support Vector Machine (SVM) learning process, is used as a classifier. Optionally, feedback based on the actual failure/non-failure of the drive can be provided as feedback 520 and used to continuously train the learning process 500 to improve the accuracy of the learning process 500.

An example supervised machine learning process 500 was trained using training examples 510 that were collected from an enterprise-class drive model of Seagate drive, model ST31000524NS. Each training example 510 was associated with a drive that had either failed or was in good operating condition. The failure attribute was [−1] for drives that had failed and [1] for drives that had not failed. Attributes of the operational parameters of the drives were collected, and each attribute value was scaled to an interval of between [−1,1] with the exact values withheld. The attributes that were collected included:

VALUE of S.M.A.R.T. ID #1, Raw Read Error Rate
   VALUE of S.M.A.R.T. ID #3, Spin-Up Time
   VALUE of S.M.A.R.T. ID #5, Reallocated Sectors Count
   VALUE of S.M.A.R.T. ID #7, Seek Error Rate
   VALUE of S.M.A.R.T. ID #9, Power-On Hours
   VALUE of S.M.A.R.T. ID #187, Reported Uncorrectable Errors
   VALUE of S.M.A.R.T. ID #189, High Fly Writes
   VALUE of S.M.A.R.T. ID #194, Temperature Celsius
   VALUE of S.M.A.R.T. ID #195, Hardware ECC Recovered
   VALUE of S.M.A.R.T. ID #197, Current Pending Sector Count
   RAW VALUE of S.M.A.R.T. ID #5, Reallocated Sectors Count
   RAW VALUE of S.M.A.R.T. ID #197, Current Pending Sector Count Once trained, the learning process 500 was used to predict (classify) 505 a drive as either failed or normal.

Figure 6:
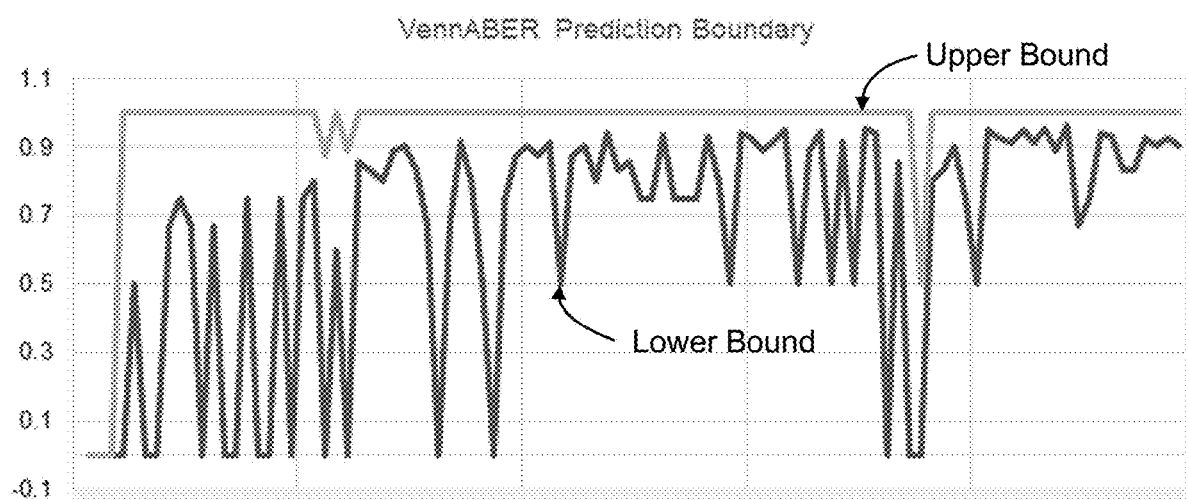
FIG. 6 is a graph showing an example output of a Venn-ABERS prediction boundary from the analytics engine of FIG. 5, according to some embodiments.

The output 515 of the trained learning process 500, in some embodiments, contains an identification of a set of drives that are classified as failing. The drives that are classified as failing by the trained learning process 500 are input to the Venn-ABERS framework 505. The Venn-ABERS framework 505, described above, is then used to generate, as output 525, a failure probability boundary for each drive classified as failing. FIG. 6 shows the Venn-ABERS prediction boundary for the first 100 data points. The upper and lower boundaries smooth out with additional data points.

Accordingly, in some embodiments, the analytics engine 205 shown in FIG. 6 can be used to both classify a drive as either failed or not failed, and if the drive is classified as failing, generate a boundary of failure probability for a given drive.

Table II, shown below, gives an example output for several drives. As shown in Table II, the output 525 of the analytics engine 205 is a failure prediction accompanied by the prediction boundaries. The smaller the prediction boundary, the better the prediction. In Table II, the drives are listed in descending order of failure probability distribution (in n-days before failure).

TABLE II

| Drive Serial Number | Failure Probability Distribution |
|---|---|
| P9JB1H4W | [0.987, 0.912] |
| K4KT612L | [0.901, 0.828] |
| YVKW267K | [0.854, 0.872] |
| ZSEEUIQ4K | [0.782, 0.645] |
| LM7RQWD9 | [0.601, 0.591] |

Thus, based on average value of the boundaries and their difference, it is possible to determine which drives are likely to fail, and know the reliability of the prediction. In some embodiments, the output of the analytics engine 205 is provided as input to the RAID controller 200.

After the drives are ranked, the RAID controller 200 knows which RAID groups 230 are more prone to failure, based on the number of failing drives contained in the various RAID groups 230. The RAID controller 200, in some embodiments, implements a variable sparing process described below in connection with FIGS. 7-11, and uses the rankings from the analytics engine 205 to optimize the number of spare drives that are associated with each RAID group 230 or with a set of RAID groups 230.

Figure 7:
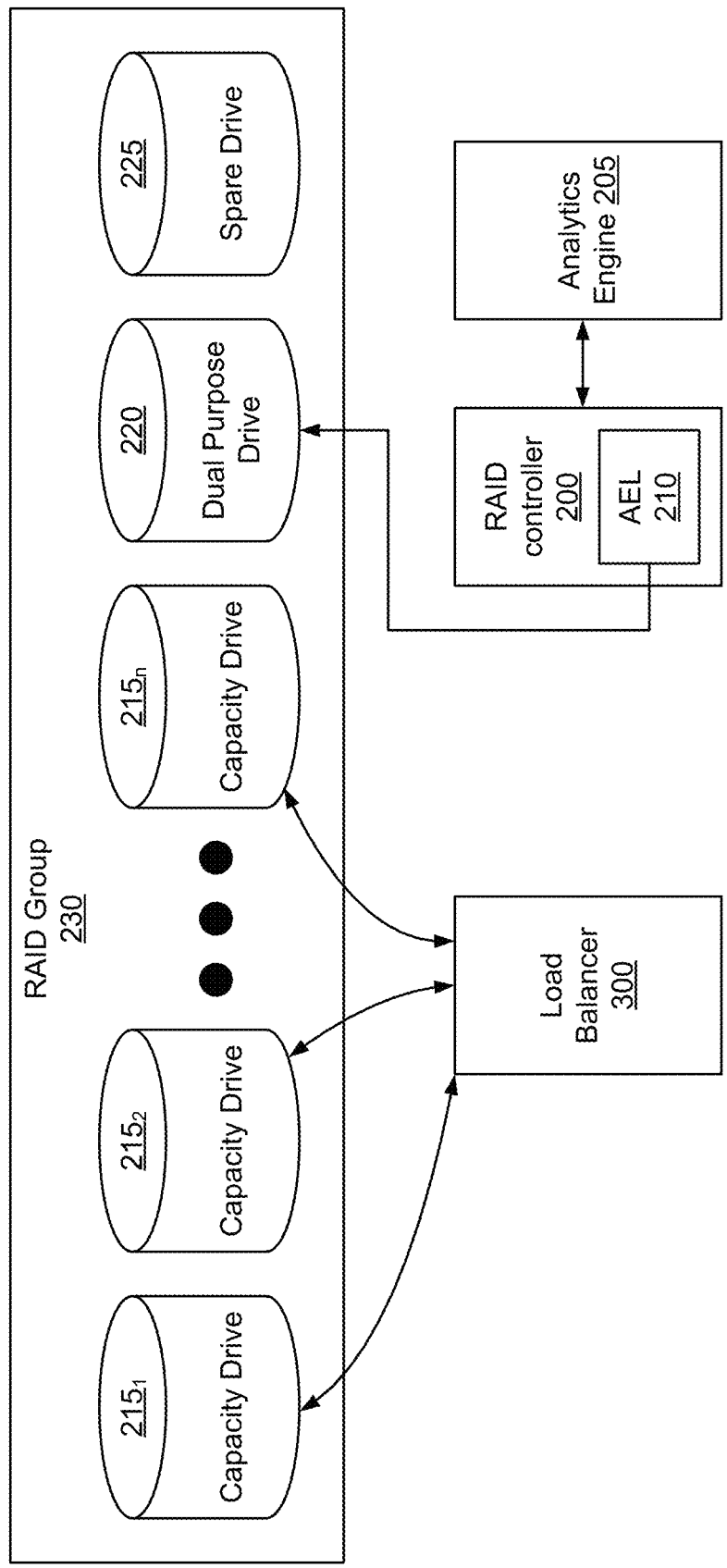
FIG. 7 is a functional block diagram of a RAID group, according to some embodiments.
Figure 8:
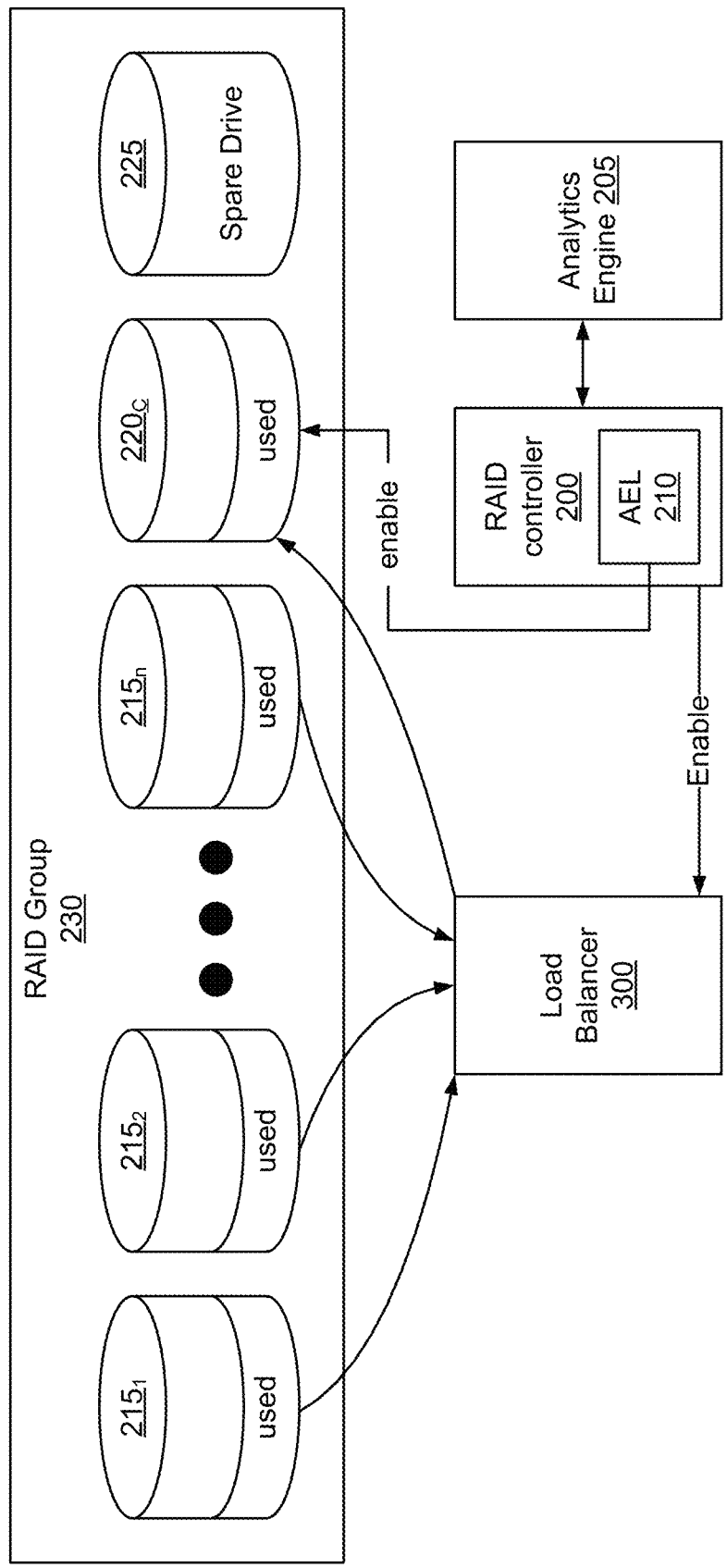
FIG. 8 is a functional block diagram of the RAID group of FIG. 7, showing use of a dual-purpose drive as a capacity drive when the number of failing capacity drives is lower than a minimum spare value, according to some embodiments.
Figure 9:
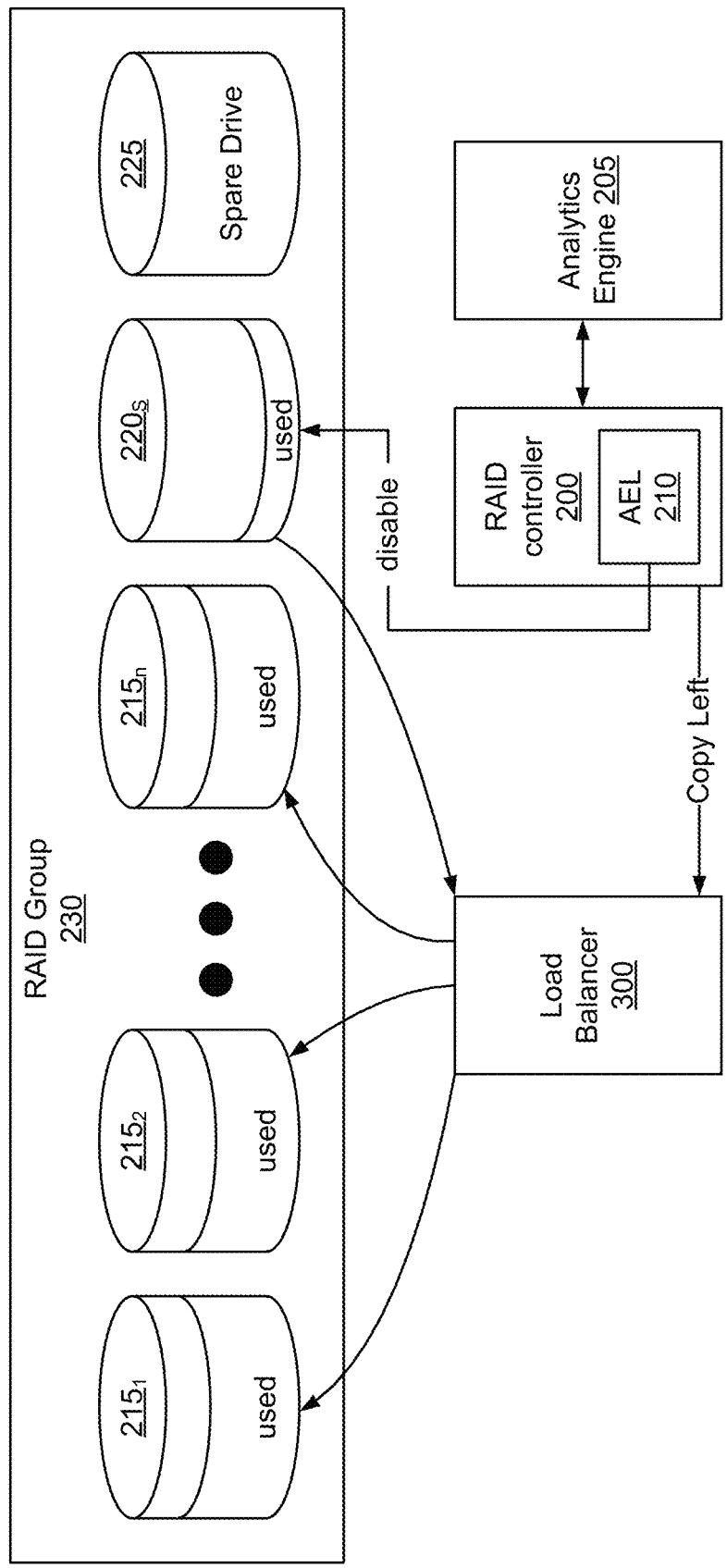
FIG. 9 is a functional block diagram of the RAID group of FIG. 7, showing transition of the dual-purpose drive into an augmented spare drive when the number of failing capacity drives is above a minimum spare value, according to some embodiments.
Figure 10:
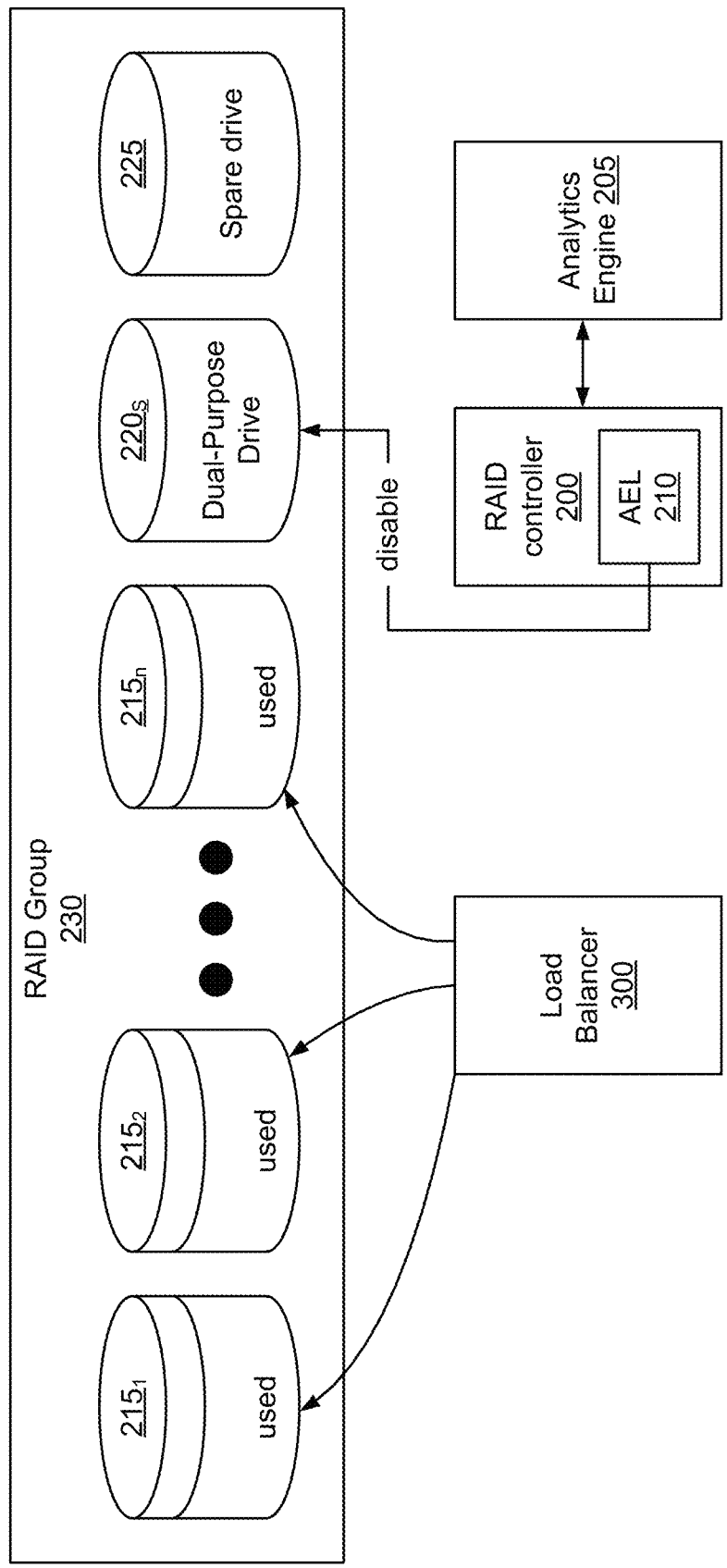
FIG. 10 is a functional block diagram of the RAID group of FIG. 7, after conversion of the dual-purpose drive from a capacity drive into an augmented spare drive, according to some embodiments.

FIG. 7 shows an example RAID group 230, and FIGS. 8-10 show how the use of variable sparing enables dual-purpose drives 220 to be used either as additional capacity drives or augmented spare drives, according to some embodiments. The reference numeral 220c will be used to refer to a dual-purpose drive when that is user-addressable and is being used as an additional capacity node 215. The reference numeral 220s will be used to refer to a dual-purpose drive when that drive not user-addressable and is being used as a spare node 225.

As shown in FIG. 7, an example RAID group 230 includes a set of capacity drives 215 (labelled $215_1$-$215_n$), one or more dual-purpose drives 220, and one or more spare drives 225. Although FIG. 7 shows that the RAID group 230 includes a dedicated spare drive 225, in some embodiments the RAID group includes only capacity drives and dual-purpose drives 220. I/O workload on the RAID group 230 is distributed across the set of user-addressable drives by load balancer 300. Drives of the RAID group 230 that are always user-addressable, and are reserved for holding user data, are referred to herein as capacity drives 215. A dual-purpose drive 220 is either user-addressable or not user-addressable, depending on the state of the drive. A spare drive 225 is not user-addressable until one of the capacity drives 215 fails, in which case it is used to replace the failed capacity drive 215.

The analytics engine 205 is used to identify capacity drives 215 that are in danger of failing, and provide a determination of the boundary of the failure probability. A RAID controller 200 receives input from the analytics engine 205 and sets the addressability of the dual-purpose drive 220 using an Addressability Enabling Latch (AEL) 210 for the dual-purpose drive 220. In some embodiments, the state of the AEL 210 indicates whether the user-addressability of a dual-purpose drive 220 should be turned on. In a first state, the AEL 210 enables the dual-purpose drive 220 to be user-addressable, so that the dual-purpose drive 220 can be used as an additional capacity drive 215 in the RAID group 230. In a second state, the AEL 210 causes the dual-purpose drive 220 to not be user-addressable, so that the dual-purpose drive 220 can be used as an augmented spare drive 225 by the RAID group 230.

Although FIG. 7 shows an implementation in which there is one dual purpose drive 220, multiple dual-purpose drives 220 may be included in a RAID group 230, depending on the embodiment. Additionally, although the dual-purpose drive 220 and spare drive 225 are shown as belonging to the RAID group (local spare drive), the dual-purpose drive 220 and/or spare drive 225 can be shared between multiple RAID groups 230 (global spare drive that is shared between multiple RAID groups).

A minimum count of spare drives 225 (min spare) as well as a maximum count of spare drives 225 (max spare) is maintained for every RAID group 230. The (min spare) count of drives specifies the number of spare drives 225 that must be reserved for sparing for a particular RAID group. The minimum number of spare drives (min spare) assigned to a RAID group can change over time, depending on the likelihood that one or more of the capacity drives will fail. For example, if there are two failing capacity drives in a given RAID group, the min spare value for the RAID group can increase to ensure that the RAID group includes at least two spare drives. By contrast, if the RAID group does not have any failing drives, the min spare value can decrease such that the RAID group has at most one spare drive. The (max spare) count of drives specifies the maximum number of spare drives 225 that will be assigned to the RAID group 230. In some embodiments, the min spare value and the max spare value, and the manner in which the min spare value changes, depend upon the criticality of data held by the capacity drives 215 of the RAID group and is user-controllable.

The difference between (max spare) and (min spare) is the number of dual-purpose drives in the RAID group 230:

dual-purpose drives=(max spare)−(min spare).

The dual-purpose drives 220 are conditionally user-addressable. This enables the dual-purpose drives 220 to serve as an augmented spare drive 220s or as a capacity drive 220c depending on the criticality of the capacity drives 215 assigned to the RAID group.

The analytics engine 205 outputs the probability of failure for the 'failing' drives identified by the classification algorithm. In some embodiments, a failure probability threshold is defined, above which a likelihood of drive failure is considered sufficiently likely to be deemed serious. For purposes of discussion, it will be assumed that the failure probability threshold value is set to 0.50, although other threshold values may be used depending on the implementation.

If the failure probability threshold is set to 0.50, this means that if a capacity drive has a probability of failure greater than 0.50, the data contained on the capacity drive will be protected in the RAID group 230 using a spare drive 225. If the probability of the drive failing is less than the failure probability threshold, then that capacity drive 215 is likely to be able to continue normal operation in the near future, and does not need to be backed up by a spare drive 225. As noted above, depending on the condition of the capacity drives 215, the AEL 210 for one or more of the dual-purpose drives 220 is selectively set to either enable the dual-purpose drive 220 to be user-addressable or to cause the dual-purpose drive 220 to not be user-addressable.

FIG. 8 shows the state of a RAID group 230 where the AEL for one of the dual-purpose drives 220 has been set such that the dual-purpose drive 220c is user-addressable. As shown in FIG. 8, in some embodiments the RAID controller 200 controls the state of the AEL 210 for the dual-purpose drive 220. Setting the AEL 210 for the dual-purpose drive to make the dual-purpose drive 220 user-addressable, causes the dual-purpose drive 220c to function as a capacity drive 215 in the RAID group 230. The load balancer 300 thus can distribute the IO workload on the RAID group 230 across a larger number of user-addressable drives, which enables read and write operations to occur in parallel across a larger number of drives. This, in turn, improves performance of the RAID group 230, by reducing latency associated with read/write operations on the RAID group 230. In FIG. 8, the load balancer 300 is shown as receiving an "enable" signal from the RAID controller 200 when the AEL 210 for the dual-purpose drive 220 is set to enable the dual-purpose drive 220 to be user-addressable, but this may be implemented in many ways including having the load balancer 300 read the value of the AEL 210 for the dual-purpose drive.

FIG. 9 shows the RAID group during a transition period when one of the dual-purpose drives 220 is switched from being user-addressable to being not user-addressable. As shown in FIG. 9, when a decision is made to convert a dual-purpose drive 220 from being user-addressable to being not user-addressable, the AEL 210 for the selected dual-purpose drive 220 is toggled, and the load balancer 300 copies all data currently stored on the dual-purpose drive 220 to the set of capacity drives 215 of the RAID group 230. Copying data from a dual-purpose drive 220c onto the capacity drives 215 of the RAID group 230 will be referred to herein as a "copy left" process. Although FIG. 9 shows the RAID controller 200 signaling the load balancer 300 to "copy left" the data from the transitioning dual-purpose drive 220, in some embodiments this is implemented automatically when the load balancer 300 polls the state of the AEL 210 and determines that the state of the AEL 210 has been changed to make the dual-purpose drive 220 not user-addressable.

FIG. 10 shows the state of the RAID group 230 after the copy-left process has completed. As shown in FIG. 10, in this state the dual-purpose drive 220s is an augmented spare drive for the RAID group 230 and is not user-addressable.

Figure 11:
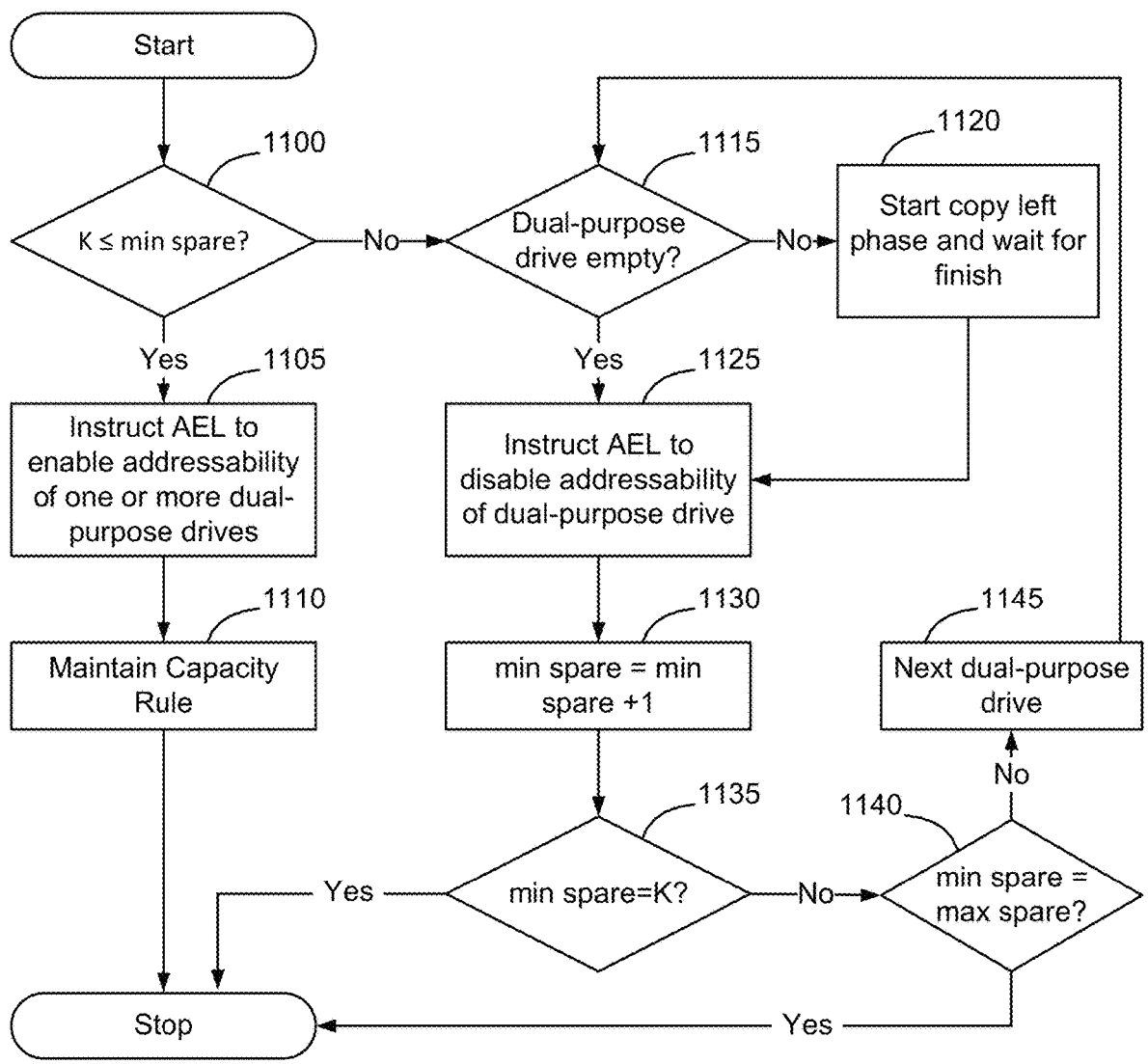
FIG. 11 is a flow chart of an example method of variable sparing in RAID groups based on drive failure probability, according to some embodiments.

FIG. 11 is a flow chart of an example method of variable sparing in RAID groups based on drive failure probability, according to some embodiments. As shown in FIG. 11, in some embodiments the determination of whether to use dual-purpose drives 220 as additional capacity drives 220c or as augmented spare drives 220s depends on the likelihood of one or more of the capacity drives 215 failing. This determination is made by the analytics engine 205 as discussed in greater detail herein.

As shown in FIG. 11, in some embodiments after determining the likelihood of each of the drives in the RAID group 230 failing, the minimum number of spare drives for the RAID group 230 is determined (min spare). The method then determines the number of failing drives K, by determining the number of capacity drives 215 in the RAID group 230 that have a failure probability above a failure threshold. As noted above, in some embodiments the failure threshold is 0.5, although other threshold values can be used as well.

The number of failing drives K is compared with the current number of spare drives (min spare) for the RAID group 230 (block 1100). If the number of failing drives K is less than or equal to the current minimum spare capacity, K min spare, (a determination of YES at block 1100), then one or more of the dual-purpose drives are able to be used as additional capacity drives. Accordingly, the RAID controller instructs the AEL for one of the dual-purpose drives 220 that is currently in the augmented spare state to make the dual-purpose drive 220 user-addressable (block 1105). Although some embodiments use "less than or equal to" in block 1100, in other embodiments the comparison in block 1100 may be to determine if the number of failing drives K is less than the current minimum spare capacity, K<min spare. In embodiments where a determination is made that K<min spare, when K=min spare the process ends.

Making the dual-purpose drive 220 user-addressable, effectively increases the number of drives that are able to be used to implement IO workload on the RAID group 230. Making the dual-purpose drive 220 user-addressable therefore improves performance of the RAID group 230, by spreading the IO workload across a larger number of user-addressable drives 215.

However, in some embodiments, adding an additional user-addressable device to the RAID group should not increase the total amount of data that is stored in the RAID group 230, because if the dual-purpose node 220 needs to be converted back to function as an augmented spare node 220s for the RAID group 230, the data that is stored on the dual-purpose node will need to be moved from the dual-purpose node 220c to the remaining capacity drives 215.

Specifically, in some embodiments, in the event that the one of the capacity drives 215 shows a failure probability above the failure threshold, one or more of the dual-purpose drives 220 should be able to be converted back to function as an augmented spare drive 225 in the RAID group 230. This will require the data stored in the dual-purpose drive 220 to be moved to the other capacity drives 215 of the RAID group 230 as shown in FIG. 9, or a new drive will need to be added to the RAID group. Accordingly, in some embodiments a capacity rule is maintained (block 1110) as a hard rule, such that the amount of data stored in the dual-purpose drive 220 is required to be less than or equal to the sum of the remaining capacity in the set of capacity drives 215. This is shown by the following equation:

$$\sum_{i=1}^{n} x_i \geq y$$

where $x_i$=the remaining capacity of the $i^{th}$ capacity drive $215_i$, and y=the amount of data currently stored on the dual-purpose drive 220. Accordingly, as shown in FIG. 11, when one of the dual-purpose drives 220 is set to be user-addressable, the RAID controller maintains the capacity rule for the RAID group 230 (block 1110).

In some embodiments, after setting one of the dual-purpose drives 220 to be user-addressable while maintaining the capacity rule for the RAID group 230, the process ends. In other embodiments, the value of the number of spare drives associated with the RAID group is decremented (min spare=min spare−1), and the process returns to block 1100. Blocks 1100, 1105, and 1110 iterate making each of the dual purpose drives 220 user-addressable, until the total number of dedicated spare drives and non-user-addressable dual purposes drives 220s is equal to the minimum number of spare drives for the RAID group.

If it is determined that the number of failing drives K of is greater than the current spare capacity (min spare) for the RAID group 230 (a determination of NO at block 1100), some of the dual-purpose drives will need to be converted to augmented spare drives 220s for the RAID group 230. In particular, this condition would indicate that there is insufficient spare capacity in the RAID groups, given the likelihood of failure of the current set of capacity drives in the RAID group. Accordingly, one or more dual-purpose drives should be emptied and used as spare drives for the RAID group 230.

As shown in FIG. 11, to implement this process, in some embodiments a first of the dual-purpose drives 220 is selected. Any selection process may be used to select the dual-purpose drive 220 to be converted to an augmented spare. In some embodiments, a dual-purpose drive 220 is selected based on the amount of data stored on the dual-purpose drive 220 that will need to be copied left during the conversion process, for example by selecting the dual-purpose drive with the least amount of data to minimize data movement within the RAID group.

Once a dual-purpose drive 220 has been selected, a determination is made as to whether the selected dual-purpose drive is empty (block 1115). If the dual-purpose drive 220 is not empty (a determination of NO at block 1115), the load balancer 300 starts a copy-left process to move the data from the dual-purpose drive 220 to the capacity drives 215 (block 1120).

If the selected dual-purpose drive 220 is empty (a determination of YES at block 1115) or once the copy-left process has completed, the AEL 210 for the dual-purpose drive is changed to disable addressability of the dual-purpose drive 220 (block 1125). Optionally, block 1125 can occur before the copy left process of block 1120 starts or completes. The minimum spare value (min spare) for the RAID group is incremented by one (block 1130), and the increased minimum spare value for the RAID group is compared with the number K of failing capacity drives 215.

If the number of spare drives 225 and dual-purpose drives 220s operating as augmented spare drives in the RAID group are equal to the number of failing capacity drives 215 (a determination of YES at block 1135) the process ends. If the number of spare drives 225 and dual-purpose drives 220s operating as augmented spare drives in the RAID group are still less than the number of failing capacity drives (a determination of NO at block 1135), a determination is made as to whether the number of spare drives 225 and dual-purpose drives 220 operating as augmented spare drives in the RAID group 230 has reached the maximum number of spare drives (max spare) (block 1140). If the number of spare drives has not reached the maximum number of spare drives (a determination of NO at block 1140), another dual-purpose is selected (block 1145) and the process returns to block 1115. Once the number of spare drives 225 and dual-purpose drives 220s operating as augmented spare drives has reached the maximum number (max spare) for the RAID group 230 (a determination of YES at block 1140) the process ends. Optionally, the check performed at block 1140 may be implemented after block 1100 as well, such that the variable sparing process will check to determine if min spare =max spare prior to selecting a dual purpose drive and converting the dual purpose drive to a spare drive in blocks 1115-1130.

As shown in FIG. 11, two cases arise after the count of drives K with a failure probability greater than the threshold (k) is obtained. If number of failing drives is less than or equal to the minimum amount of spare capacity for the RAID group (min spare), this means the capacity drives 215 are working fine and there is a low probability they will fail. This implies that the current number of drives is enough for sparing purposes, and the dual-purpose drives 220 can be used to hold user data. Hence the AEL 210 makes those drives available to the load balancer 230. This results in enhanced performance of the overall RAID group 230 as the capacity drives 215 get less stressed. Since the failure probability of a given set of capacity drives 215 builds slowly over time, the process of setting a dual-purpose drive as user-addressable or not user-addressable is not likely to change frequently. Accordingly, this process does not add significant overhead to the RAID group and is unlikely to cause frequent movement of data within the RAID group.

As discussed in greater detail above, in some embodiments a SVM classifier trains a failure prediction model incrementally, such that the failure prediction model learns and predicts simultaneously. This enables the SVM classifier to favor changing properties of predictor values over time in unforeseen ways by continuously adjusting as additional drive failures occur. Further, by using S.M.A.R.T. parameters from the drives, which are values that are generally available from most commercial drives, as well as SCSI return error values, the SVM classifier can use a hybrid approach for feature selection to identify a set of features with enhanced correlation with drive failure.

The Venn-ABERS framework complements the predictions of the SVM machine learning algorithms to enhance the reliability of the failure forecasts. Specifically, the Venn-ABERS predictor framework provides boundary measures of probability, which can be interpreted as an indication of the quality of prediction, and enables probability-boundary forecasting.

The variable sparing mechanism helps in optimization of utilization of storage associated with RAID groups 230. Variable sparing converts dual-purpose drives 220 to capacity drives or spare drives according to the health of the capacity drives in the RAID group 230. This enables the dual-purpose drives 220 to automatically switch roles within the RAID group 230, which makes it possible to use the capacity of some of the spare drives when the capacity drives 215 of the RAID group 230 are healthy, and to increase the spare capacity allocated to the RAID group 230 when one or more of the capacity drives 215 is determined to be likely to fail.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible non-transitory computer readable medium such as random-access memory, a computer memory, a drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for variable sparing in a RAID group based on drive failure probability, the RAID group having a set of capacity drives, one or more dual-purpose drives, and one or more spare drives, the computer program including a set of instructions which, when executed by a computer, cause the computer to perform a method comprising the steps of:

classifying each of the capacity drives of the RAID group as either healthy or being in danger of failing;

for each capacity drive classified as being in danger of failing, determining a respective failure probability boundary value for the capacity drive classified as being in danger of failing;

determining a number of failing drives of the RAID group, by comparing the failure probability boundary values of the capacity drives classified as being in danger of failing with a failure threshold;

comparing the number of failing drives with a minimum spare capacity value for the RAID group; and when the number of failing drives is less than the minimum spare capacity value for the RAID group, setting a state of one of the dual-purpose drives of the RAID group to a first value to cause the dual-purpose drive to operate as a capacity drive in the RAID group such that IO workload on the RAID group is distributed across the capacity drives of the RAID group that are classified as healthy, the capacity drives of the RAID group that are classified as being in danger of failing, and the one of the dual-purpose drives; and when the number of failing drives is greater than the minimum spare capacity value for the RAID group, setting the state of the one of the dual-purpose drives of the RAID group to a second value to cause the dual-purpose drive to operate as a dedicated spare drive in the RAID group such that the IO workload on the RAID group is distributed across the capacity drives of the RAID group that are classified as healthy and the capacity drives of the RAID group that are classified as being in danger of failing, and not distributed to the one of the dual-purpose drive until one of the healthy capacity drives of the RAID group, or one of the capacity drives of the RAID group classified as being in danger of failing, actually fails.

2. The non-transitory tangible computer readable storage medium of claim 1, wherein the step of classifying each of a set of capacity drives of a RAID group as either being in danger of failing or healthy is implemented using a trained support vector machine classifier learning process.

3. The non-transitory tangible computer readable storage medium of claim 2, further comprising providing, as feedback to the support vector machine classifier learning process, information related to drive failure events.

4. The non-transitory tangible computer readable storage medium of claim 1, wherein the step of determining the failure probability boundary values for the capacity drives classified as being in danger of failing is implemented using a Venn-ABERS framework.

5. The non-transitory tangible computer readable storage medium of claim 1, wherein setting the state to the first value to cause the dual-purpose drive to operate as a capacity drive in the RAID group further comprises a step of maintaining a capacity rule for the RAID group.

6. The non-transitory tangible computer readable storage medium of claim 5, wherein the capacity rule for the RAID group includes a hard rule that an amount of data stored in the dual-purpose drive cannot exceed a sum of remaining capacity in the set of capacity drives of the RAID group.

7. The non-transitory tangible computer readable storage medium of claim 1, wherein the step of setting the state of the one of the dual-purpose drives of the RAID group to a second value comprises copying data contained on the dual-purpose drive to the capacity drives of the RAID group.

8. A method of variable sparing in a RAID group based on drive failure probability, the RAID group having a set of capacity drives, one or more dual-purpose drives, and one or more spare drives, the method comprising the steps of:

classifying each of the capacity drives of the RAID group as either healthy or being in danger of failing;

for each capacity drive classified as being in danger of failing, determining a respective failure probability boundary value for the capacity drive classified as being in danger of failing;

determining a number of failing drives of the RAID group, by comparing the failure probability boundary values of the capacity drives classified as being in danger of failing with a failure threshold;

comparing the number of failing drives with a minimum spare capacity value for the RAID group; and when the number of failing drives is less than the minimum spare capacity value for the RAID group, setting a state of one of the dual-purpose drives of the RAID group to a first value to cause the dual-purpose drive to operate as a capacity drive in the RAID group such that IO workload on the RAID group is distributed across the capacity drives of the RAID group that are classified as healthy, the capacity drives of the RAID group that are classified as being in danger of failing, and the one of the dual-purpose drives; and when the number of failing drives is greater than the minimum spare capacity value for the RAID group, setting the state of the one of the dual-purpose drives of the RAID group to a second value to cause the dual-purpose drive to operate as a dedicated spare drive in the RAID group such that the IO workload on the RAID group is distributed across the capacity drives of the RAID group that are classified as healthy and the capacity drives of the RAID group that are classified as being in danger of failing, and not distributed to the one of the dual-purpose drive until one of the healthy capacity drives of the RAID group, or one of the capacity drives of the RAID group classified as being in danger of failing, actually fails.

9. The method of claim 8, wherein the step of classifying each of a set of capacity drives of a RAID group as either being in danger of failing or healthy is implemented using a trained support vector machine classifier learning process.

10. The method of claim 9, further comprising providing, as feedback to the support vector machine classifier learning process, information related to drive failure events.

11. The method of claim 8, wherein the step of determining the failure probability boundary values for the capacity drives classified as being in danger of failing is implemented using a Venn-ABERS framework.

12. The method of claim 8, wherein setting the state to the first value to cause the dual-purpose drive to operate as a capacity drive in the RAID group further comprises a step of maintaining a capacity rule for the RAID group.

13. The method of claim 12, wherein the capacity rule for the RAID group includes a hard rule that an amount of data stored in the dual-purpose drive cannot exceed a sum of remaining capacity in the set of capacity drives of the RAID group.

14. The method of claim 8, wherein the step of setting the state of the one of the dual-purpose drives of the RAID group to a second value comprises copying data contained on the selected dual-purpose drive to the capacity drives of the RAID group.

15. A storage system, comprising:
a RAID group including a set of capacity drives, a dual-purpose drive, and a spare drive, the dual-purpose drive being configured to operate either as a spare drive in the RAID group if user-addressability has not been enabled on the dual-purpose drive, or to operate as a capacity drive in the RAID group if user addressability has been enabled on the dual-purpose drive;
an analytics engine;
a RAID controller; and
a load balancer,
wherein the analytics engine contains control logic configured to:
classify each of the capacity drives of the RAID group as either healthy or being in danger of failing;
for each capacity drive classified as being in danger of failing, determine a respective failure probability boundary value for the capacity drive classified as being in danger of failing;
determine a number of failing drives of the RAID group, by comparing the failure probability boundary values of the capacity drives classified as being in danger of failing with a failure threshold;
compare the number of failing drives with a minimum spare capacity value for the RAID group; and
when the number of failing drives is less than the minimum spare capacity value for the RAID group, instruct the RAID controller to set a state of the dual-purpose drive of the RAID group to a first value to cause the dual-purpose drive to operate as a capacity drive in the RAID group such that IO workload on the RAID group is distributed across the capacity drives of the RAID group that are classified as healthy, the capacity drives of the RAID group that are classified as being in danger of failing, and the one of the dual-purpose drives; and
when the number of failing drives is greater than the minimum spare capacity value for the RAID group, set the state of the one of the dual-purpose drives of the RAID group to a second value to cause the dual-purpose drive to operate as a dedicated spare in the RAID group such that the IO workload on the RAID group is distributed across the capacity drives of the RAID group that are classified as healthy and the capacity drives of the RAID group that are classified as being in danger of failing, and not distributed to the one of the dual-purpose drive until one of the healthy capacity drives of the RAID group, or one of the capacity drives of the RAID group classified as being in danger of failing, actually fails.

16. The storage system of claim 15, wherein the load balancer is configured to distribute the IO workload on the RAID group across the set of capacity drives when the dual-purpose drive is not user-addressable, and is configured to distribute the IO workload on the RAID group across the set of capacity drives and the dual-purpose drive when the user-addressability of the dual-purpose drive has been enabled.

17. The storage system of claim 15, further comprising an addressability enabling latch for the dual-purpose node, and wherein the RAID controller uses the addressability enabling latch to set the state of the dual-purpose drive.

18. The storage system of claim 15, wherein the load balancer is configured to maintain a capacity rule for the RAID group, the capacity rule for the RAID group includes a hard rule that an amount of data stored in the dual-purpose drive cannot exceed a sum of available capacity of each of the other drives of the RAID group.

* * * * *